April 8, 1924.
G. L. WENDT
1,489,724
METHOD OF PRODUCING CHEMICAL REACTIONS
Filed April 28, 1922
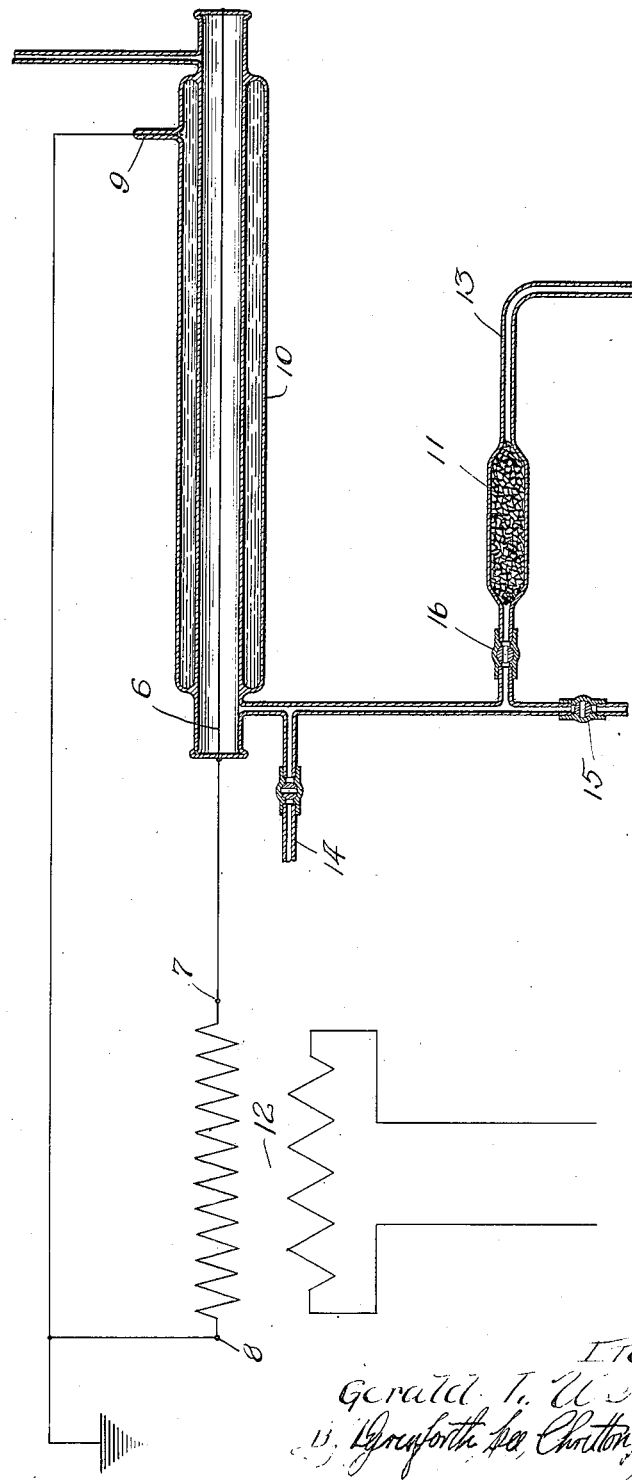

Patented Apr. 8, 1924.

1,489,724

UNITED STATES PATENT OFFICE.

GERALD L. WENDT, OF DAVENPORT, IOWA.

METHOD OF PRODUCING CHEMICAL REACTIONS.

Application filed April 28, 1922. Serial No. 557,053.

*To all whom it may concern:*

Be it known that I, GERALD L. WENDT, a citizen of the United States, residing at Davenport, in the county of Scott and State of Iowa, have invented a new and useful Improvement in Methods of Producing Chemical Reactions, of which the following is a specification.

The present invention relates to the production of chemical reactions with hydrogen, and will be fully understood from the following description, illustrated by the accompanying drawing, in which apparatus for carrying out the invention is diagrammatically shown.

In carrying out the invention hydrogen is introduced into a tube 5 of dielectric material, such as glass in which a high potential dispersed electric discharge, commonly called a silent brush or corona discharge is maintained. This may suitably be effected by the means illustrated, a central electrode 6 being connected to one pole 7 of the secondary of a transformer 12. The other pole 8 is connected to an electrode 9 entering a dilute sulfuric acid solution in a tube 10 surrounding the tube 5. A suitable voltage for operation is 20,000 to 22,000 volts, the primary current varying, say, from 1 to 10 amperes. Higher voltages, for example, those of the Tesla coil may also be employed. The specific voltage and current employed are not of importance, except that they be sufficient for the production of a corona in the manner well known in the art.

The hydrogen passes through the discharge in the tube 5, is activated thereby, and is immediately brought into contact with the reacting material, which, in the case illustrated, may be sulfur in a chamber 11 interposed in the path of the activated hydrogen. Hydrogen sulfide is formed and passes out at 13.

Gaseous or vapor reacting materials, such as nitrogen, may be introduced into the stream of activated hydrogen, for example, through the valved tube 14. Ammonia is formed, and may be drawn off through the valved tube 15, valve 16 being closed.

It is readily apparent that the hydrogen, after passage through the silent discharge, may be brought in contact with other reactive materials, such as selenium, arsenic, unsaturated oils and fats, cyclic organic compounds and the like, for the production of hydrogen compounds and hydrogenated derivatives.

I claim:

1. The method of producing chemical reactions which consists in passing hydrogen through a silent electric discharge and subsequently bringing it into contact with a reacting material.

2. The method of producing chemical reactions which consists in passing hydrogen through a silent electric discharge and subsequently bringing it into contact with nitrogen, thereby forming ammonia.

3. The method of activating hydrogen which consists in passing hydrogen through a silent electric discharge.

GERALD L. WENDT.